(12) United States Patent
Maki-Haapoja

(10) Patent No.: US 10,464,149 B2
(45) Date of Patent: Nov. 5, 2019

(54) CUTTING AND SPLITTING DEVICE

(75) Inventor: Matti Maki-Haapoja, Yliharma (FI)

(73) Assignee: REIKALEVY OY, Yliharma (FI)

( * ) Notice: Subject to any disclaimer, the term of this patent is extended or adjusted under 35 U.S.C. 154(b) by 523 days.

(21) Appl. No.: 13/697,793

(22) PCT Filed: May 11, 2011

(86) PCT No.: PCT/FI2011/050433
§ 371 (c)(1),
(2), (4) Date: Apr. 20, 2016

(87) PCT Pub. No.: WO2011/141636
PCT Pub. Date: Nov. 17, 2011

(65) Prior Publication Data
US 2016/0346851 A1 Dec. 1, 2016

(30) Foreign Application Priority Data

May 14, 2010 (FI) .................................... 20105534

(51) Int. Cl.
*B23D 59/00* (2006.01)
*B27B 31/00* (2006.01)
(Continued)

(52) U.S. Cl.
CPC ............ *B23D 59/001* (2013.01); *B27B 31/00* (2013.01); *B27B 31/003* (2013.01);
(Continued)

(58) Field of Classification Search
CPC ... B27L 7/06; B27L 7/00; B27B 31/00; B27B 31/003; B27B 31/006; B27G 3/00;
(Continued)

(56) References Cited

U.S. PATENT DOCUMENTS 3,246,550 A * 4/1966 Galey ................ B23D 36/0066
225/96.5
3,862,651 A 1/1975 Heikkinen
(Continued)

FOREIGN PATENT DOCUMENTS

DE          19940812    *  3/2001  ............. B23D 47/04
EP       0901892 A2       3/1999
(Continued)

OTHER PUBLICATIONS

Rabaud et al, "Installation for cutting wood logs/billets by sawing/splitting, has calculating unit associated to detection unit to calculate volume of cut wood by considering diameter and length of billets, and informing unit informing volume to operator", Machine Translation for FR2948054, Jan. 21, 2011, pp. 9.*

(Continued)

*Primary Examiner* — Brian W Wathen
*Assistant Examiner* — Olvin Lopez Alvarez
(74) *Attorney, Agent, or Firm* — Perkins Coie LLP

(57) ABSTRACT

A feed sensor detects location of a wood log to be moved with a feed mechanism in relation to a predetermined point in a device. A control circuit controls a feed mechanism to feed the log for a preset length on the basis of the location of the log detected by the feed sensor. The control circuit controls the cutting mechanism to cut a wood block from a log longer than the predetermined length when the feed mechanism has fed the log for the preset length and a splitting mechanism to split the wood block cut from the log.

17 Claims, 12 Drawing Sheets

Figure 1:
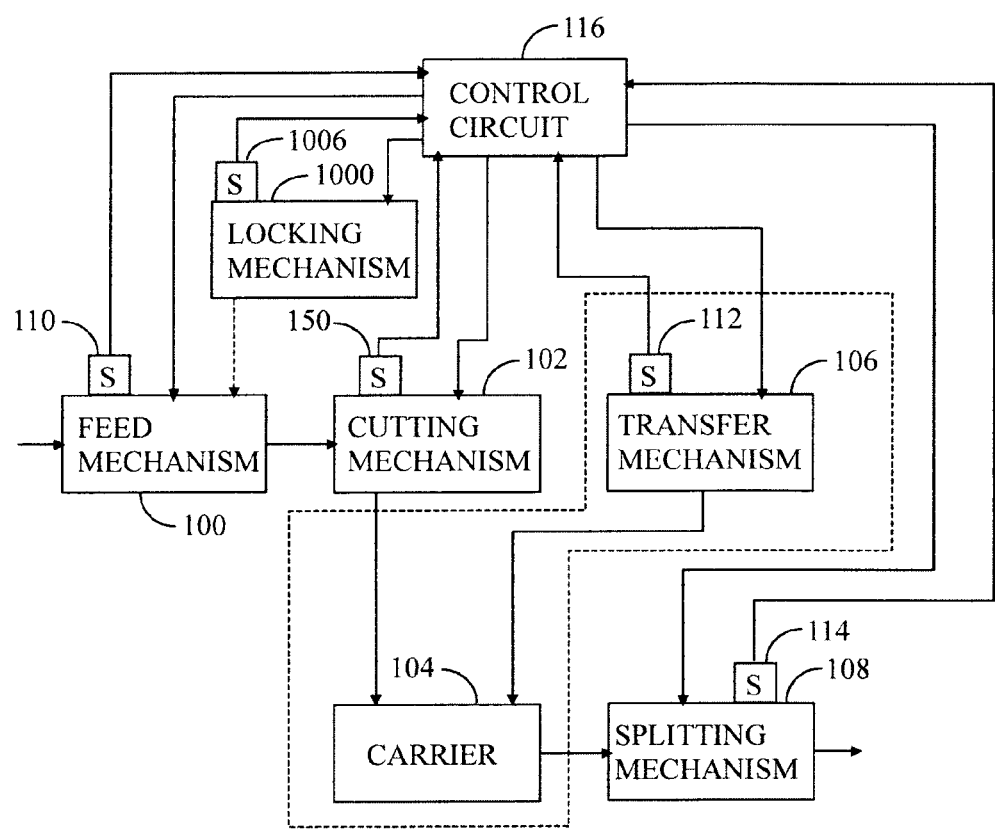

(51) Int. Cl.
*B27L 7/00* (2006.01)
*G01B 11/04* (2006.01)
*G01B 17/00* (2006.01)
*G01B 5/04* (2006.01)

(52) U.S. Cl.
CPC .............. *B27B 31/006* (2013.01); *B27L 7/00* (2013.01); *G01B 5/043* (2013.01); *G01B 11/043* (2013.01); *G01B 17/00* (2013.01)

(58) Field of Classification Search
CPC ......... B23D 59/001; B07B 1/12; B07B 13/16; G01B 5/043; G01B 11/043; G01B 17/00
USPC ......................................................... 700/167
See application file for complete search history.

(56) References Cited

U.S. PATENT DOCUMENTS

| | | | | |
|---|---|---|---|---|
| 3,871,258 A * | 3/1975 | Hum | .................. | B27B 1/002 83/210 |
| 4,017,976 A * | 4/1977 | Barr | .................. | B23D 59/008 33/1 S |
| 4,163,321 A * | 8/1979 | Cunningham | ....... | G06Q 10/043 33/1 S |
| 4,175,458 A * | 11/1979 | Paris, Jr. | .............. | B23Q 16/001 83/210 |
| 4,269,242 A * | 5/1981 | Smith | .................. | B27L 7/00 144/192 |
| 4,281,697 A * | 8/1981 | Heikkinen | ................ | B27L 7/00 144/195.1 |
| 4,284,112 A | 8/1981 | Hoskin | | |
| 4,286,638 A * | 9/1981 | Connolly | .................. | B27B 5/18 144/195.1 |
| 4,330,019 A * | 5/1982 | Murphy | .................. | B23D 45/10 144/357 |
| 4,787,281 A * | 11/1988 | Gardner | .................. | B21C 33/00 72/254 |
| 5,142,955 A * | 9/1992 | Hale | .................. | B23D 59/008 144/356 |
| 5,179,883 A * | 1/1993 | Payr | .................. | B23D 45/105 144/376 |
| 5,262,956 A * | 11/1993 | DeLeeuw | ............... | B27B 1/007 700/167 |
| 6,089,135 A * | 7/2000 | Murray | ................ | B23D 59/001 83/209 |
| 6,135,178 A * | 10/2000 | Fager | ........................ | B27L 7/00 144/193.1 |
| 6,463,402 B1 * | 10/2002 | Bennett | .................. | B27B 1/007 144/357 |
| 6,705,363 B2 * | 3/2004 | McGehee | ............... | B27B 1/007 144/245.2 |
| 6,772,665 B1 * | 8/2004 | Hurdle, Jr. | ........... | B23D 59/002 144/356 |
| 7,870,879 B2 | 1/2011 | Koskovich | | |
| 2003/0183559 A1 * | 10/2003 | Hermann | .................. | B07C 5/14 209/518 |
| 2004/0074563 A1 * | 4/2004 | MacNeil | ............... | A01G 23/095 144/335 |
| 2009/0211665 A1 * | 8/2009 | Nuutinen | ................ | B27B 29/00 144/357 |

FOREIGN PATENT DOCUMENTS

| | | | |
|---|---|---|---|
| FR | 2948054 A1 | 1/2011 | |
| JP | 825132 | * 1/1996 | ............. B23D 33/00 |
| SU | 422583 A1 | 4/1974 | |
| SU | 737210 A1 | 5/1980 | |

OTHER PUBLICATIONS

Supplementary European Search Report for EP11780271, Date of Application filed: May 11, 2011, Applicant Kolster Oy Ab, dated Dec. 16, 2012, 2 pages.
Finish Search Report for FI20105534, Date of Application filed: May 14, 2010, Applicant: Kolster Oy Ab, dated Feb. 22, 2011, 1 page.
International Search Report and Written Opinion for PCT/FI2011/050433 filed May 11, 2011, dated Jul. 19, 2011, 9 pages.

* cited by examiner

| WOOD FEED 2S | CUTTING OF LOG 2,75S | TRANSFER OF WOOD BLOCK 0,25S |
|---|---|---|
| SPLITTING OF WOOD BLOCK 2,5S | RETURN TO REST POSTION 2,5S | |

CUTTING AND SPLITTING DEVICE

CROSS-REFERENCE TO RELATED APPLICATIONS

This application is a U.S. National Stage of PCT/FI2011/050433 filed May 11, 2011, which application claims priority to Finland Application No. 20105534 filed May 14, 2010, both of which are incorporated herein by reference in their entireties.

FIELD

The invention relates to a cutting and splitting device, by which logs can be chopped into firewood.

BACKGROUND

With a wood cutting and splitting device, i.e. a wood splitter, a log is cut to measure and the blocks cut to measure are split into firewood. The wood splitters are usually operated manually, and the user interface may be a joystick, for instance. The operator feeds a log, which is on a roller conveyor, for instance, into place for cutting, guiding it with the user interface, whereafter the log may be cut off with a blade or circular saw of the wood splitter. Upon cutting, a wood block falls into a V-shaped groove. The wood block in the groove is split such that the operator controls a hydraulic cylinder of the wood splitter, for instance with a pedal, to push forward a piston that pushes the wood block in front thereof towards a splitting blade. When the piston is pushed all the way to the splitting blade, the wood block is split into pieces, and the piston returns to its initial position.

The operator may use cutting and splitting of the wood splitter consecutively. Thus, it is possible to reduce a risk of fault situations and, in the case of fault situations, to reduce damages. To speed up the operation some wood splitters may have two operators. One operator controls the cutting of a log and the other controls the splitting of wood blocks. The wood splitter's operating speed and reliability in operation depend, however, on the skill of the operator or operators.

BRIEF DESCRIPTION

The object of the invention is to provide an improved solution for cutting and splitting wood. This is achieved by a device of claim 1.

The invention also relates to a method in accordance with claim 9.

The invention further relates to a computer software product in accordance with claim 16.

Preferred embodiments of the invention are disclosed in the dependent claims.

Several advantages are achieved by a wood splitter of the invention. Log feed, cutting and splitting of wood blocks may be timed automatically to take place in relation to one another. Thus, an automatic wood splitter's operating speed and reliability in operation increase, and they are not operator-dependent.

LIST OF FIGURES

Figure 2:
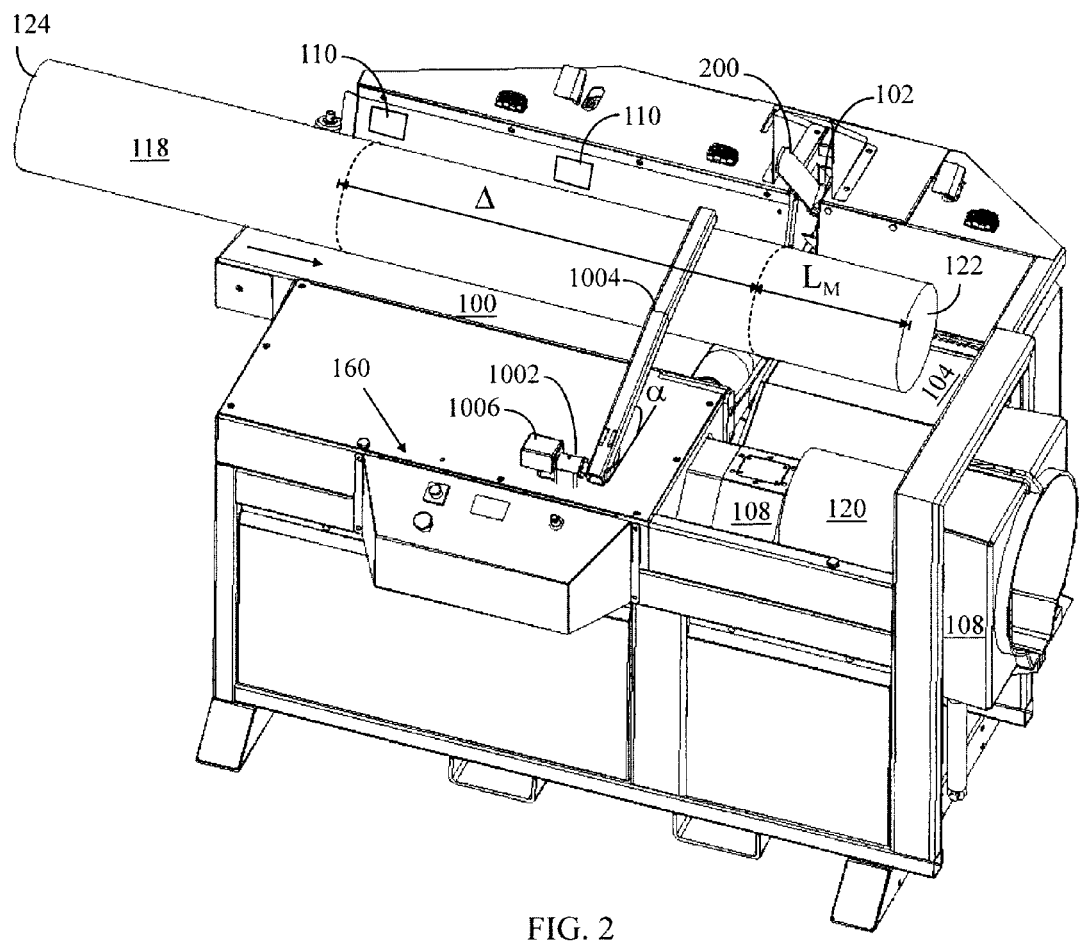
Figure 3A:
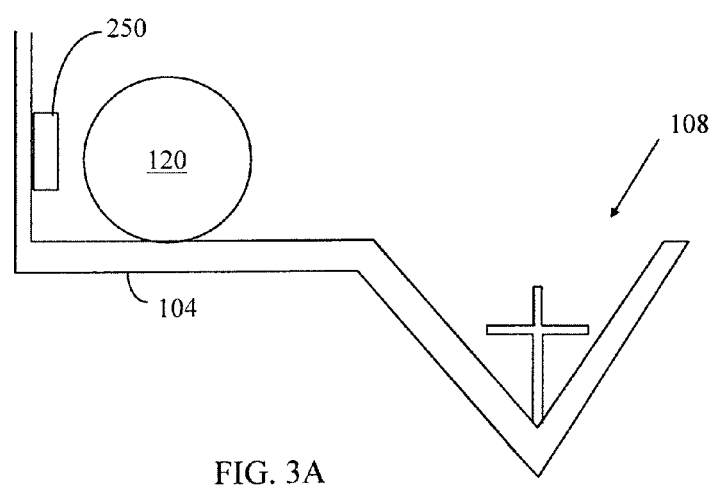
Figure 3B:
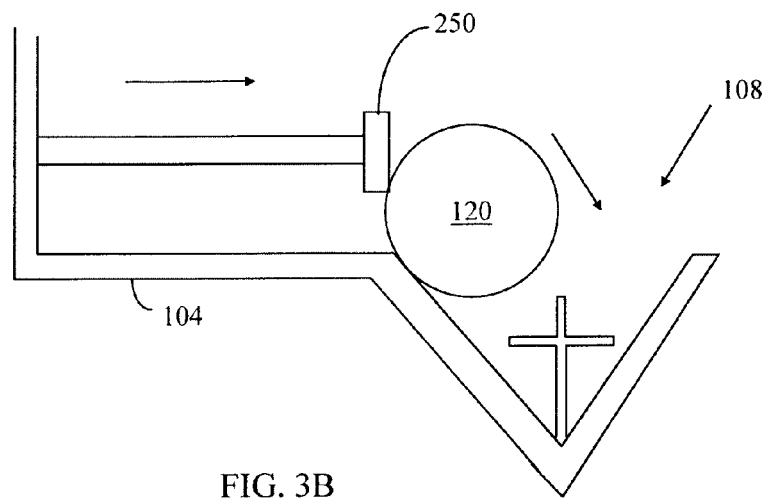
Figure 4A:
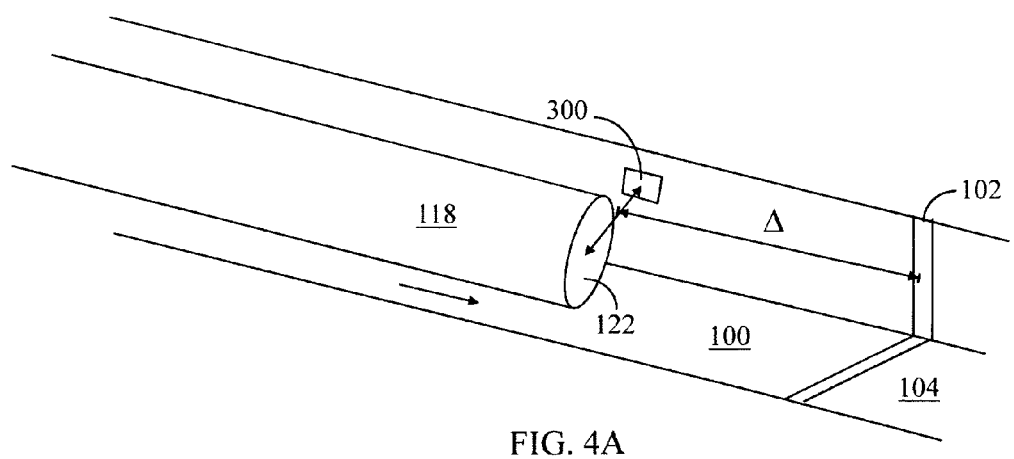
Figure 4B:
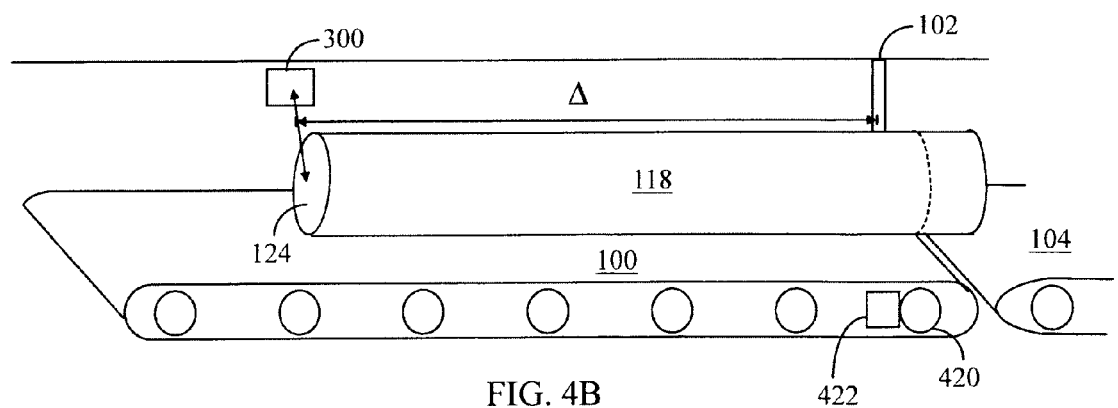
Figure 5A:
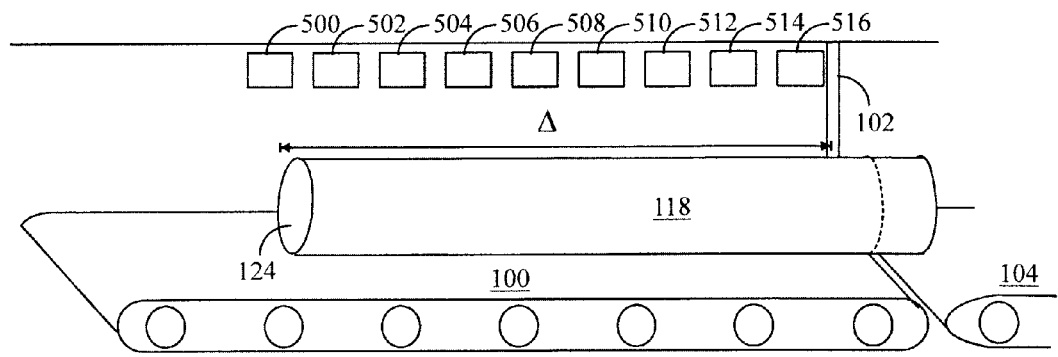
Figure 5B:
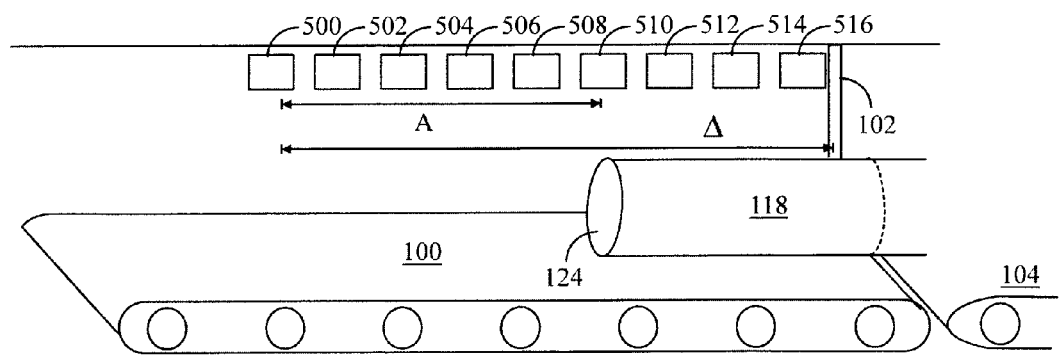
Figure 6:
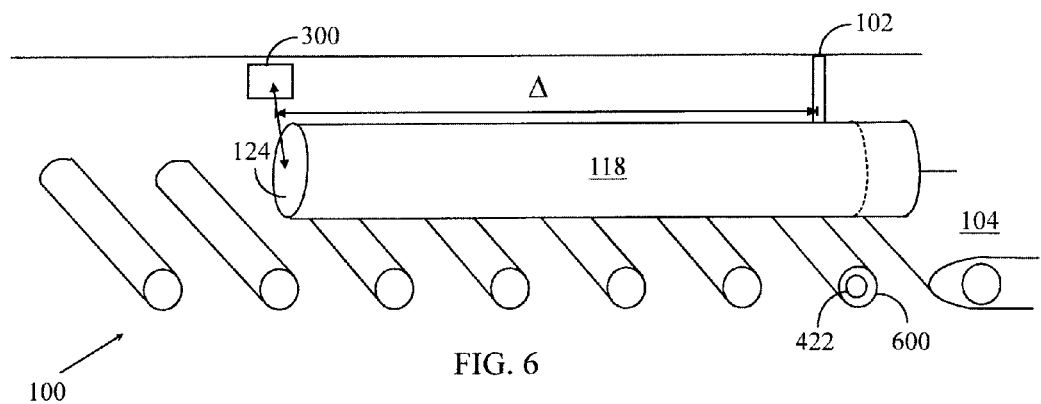
Figure 7:
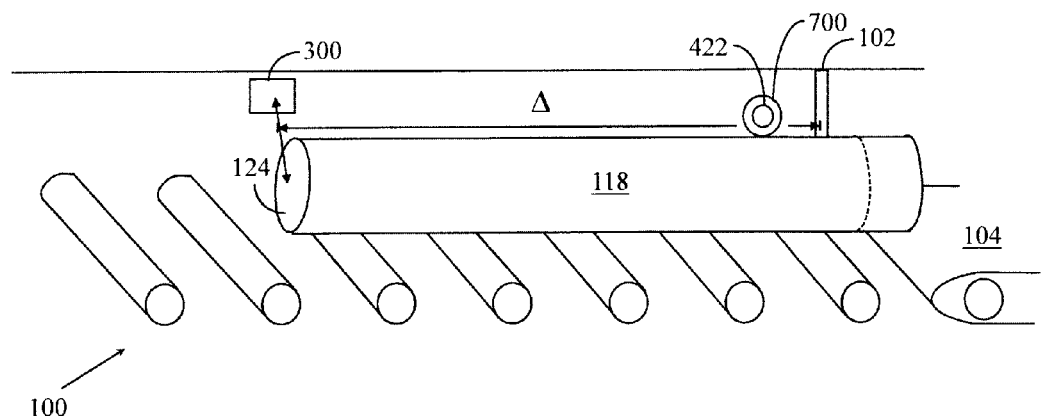
Figure 8A:
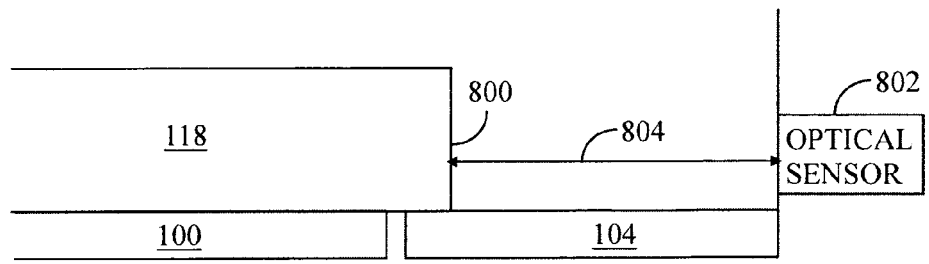
Figure 8B:
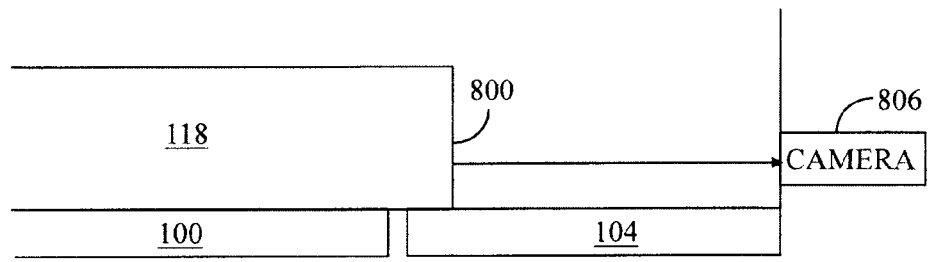
Figure 8C:
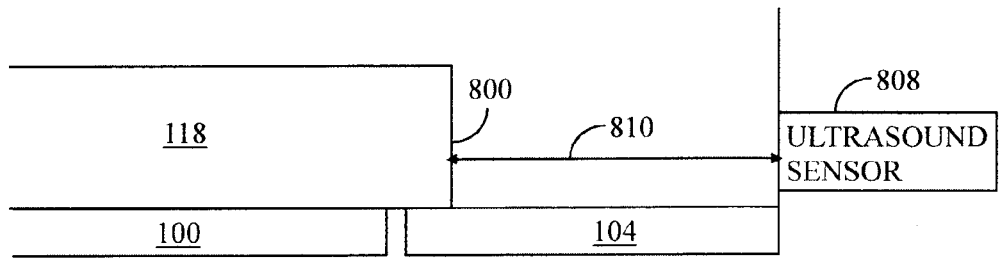
Figure 8D:
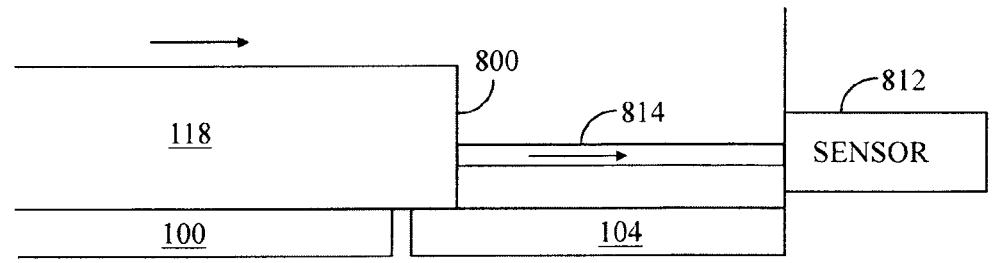
Figure 8E:
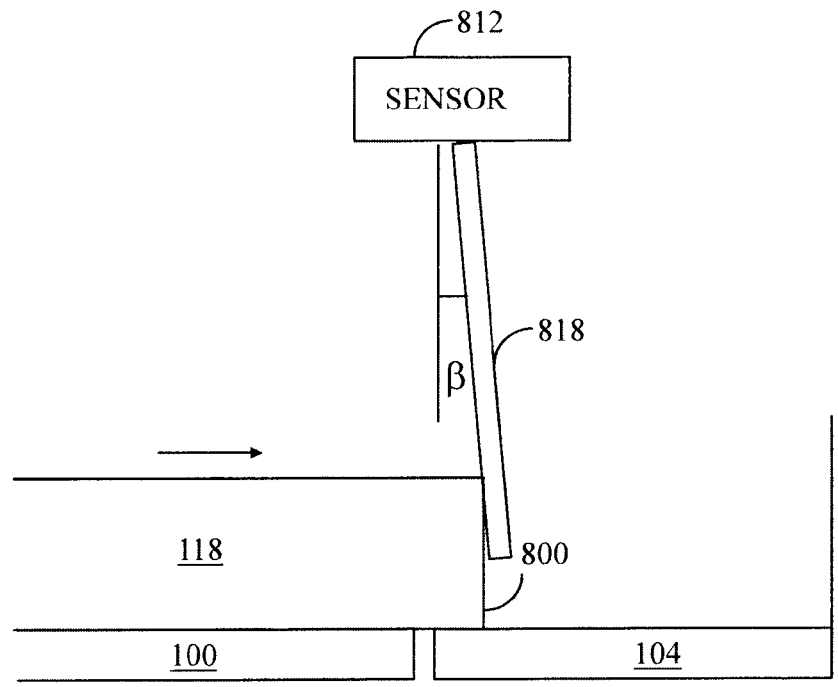
Figure 8F:
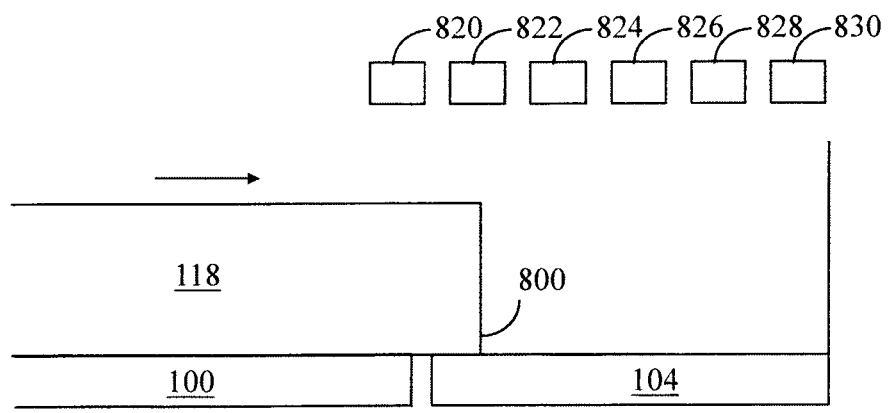
Figure 9A:
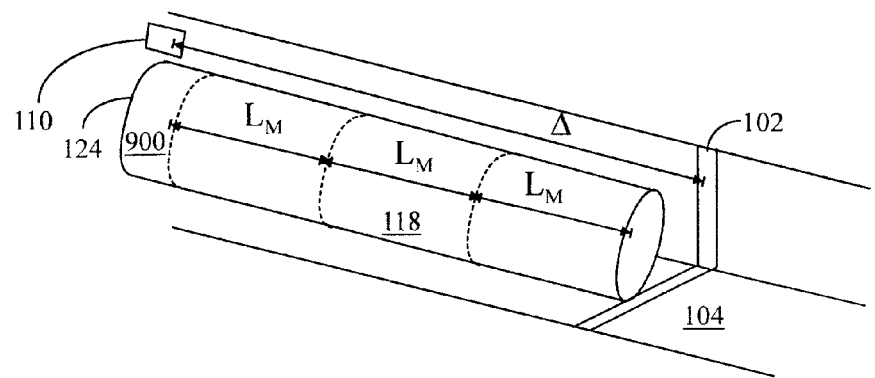
Figure 9B:
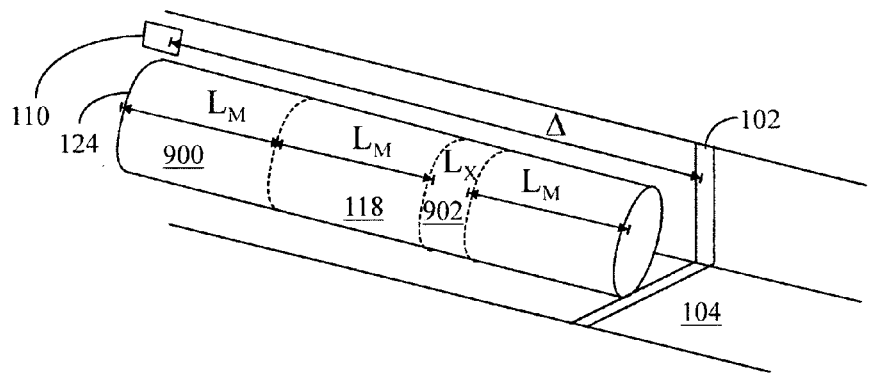
Figure 9C:
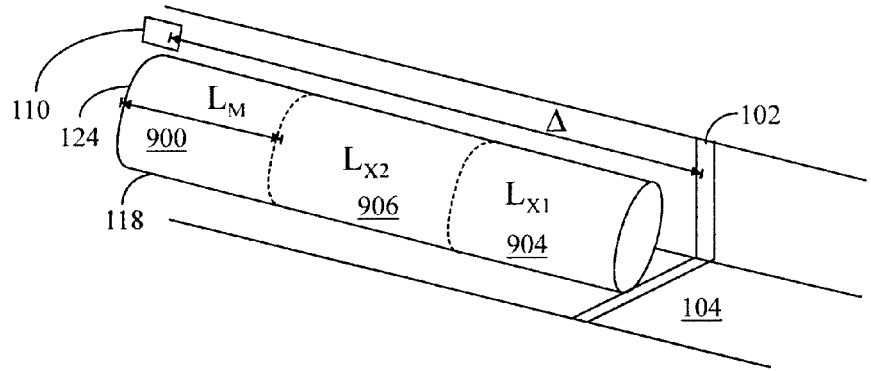
Figure 9D:
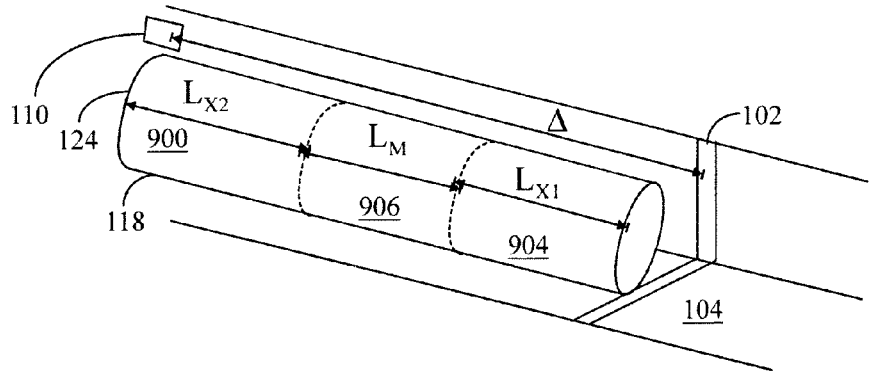
Figure 10:
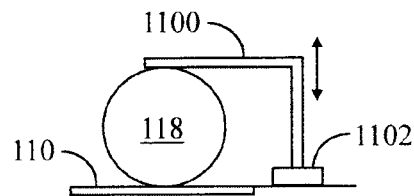
Figure 11A:
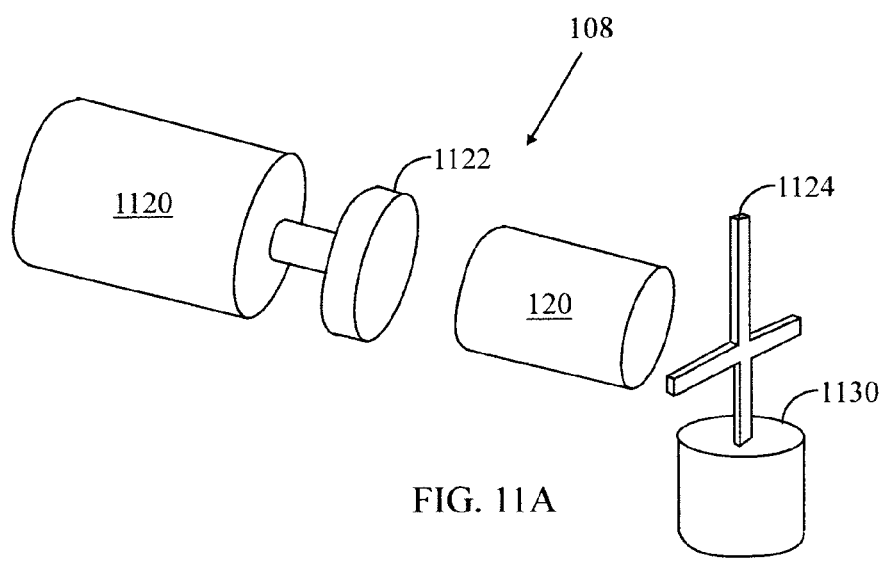
Figure 11B:
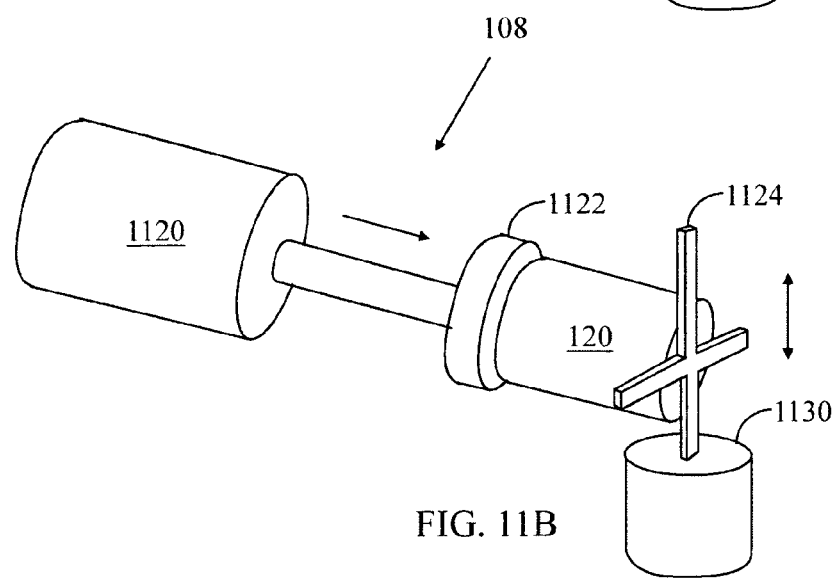
Figure 11C:
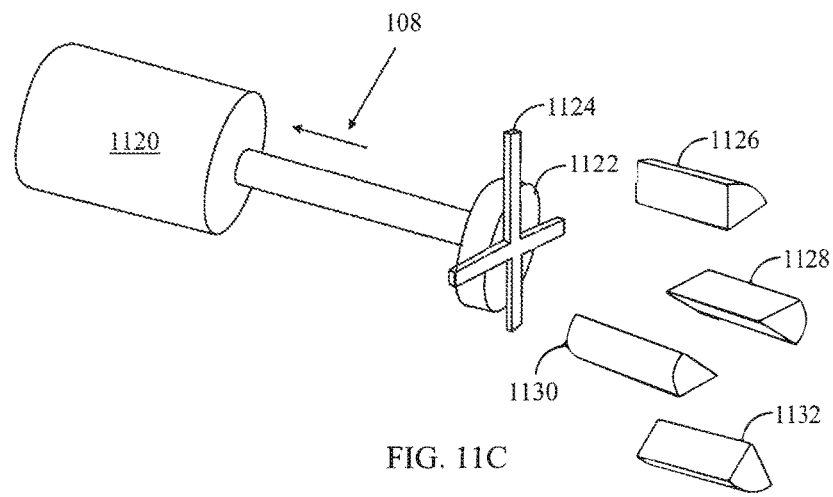
Figure 12:
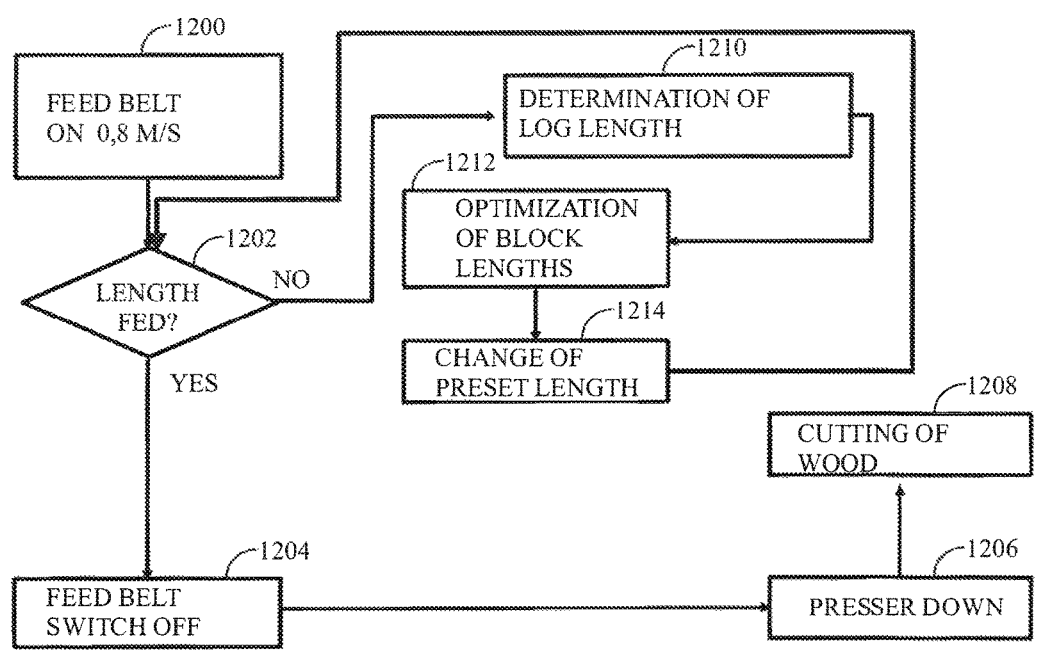
Figure 13:
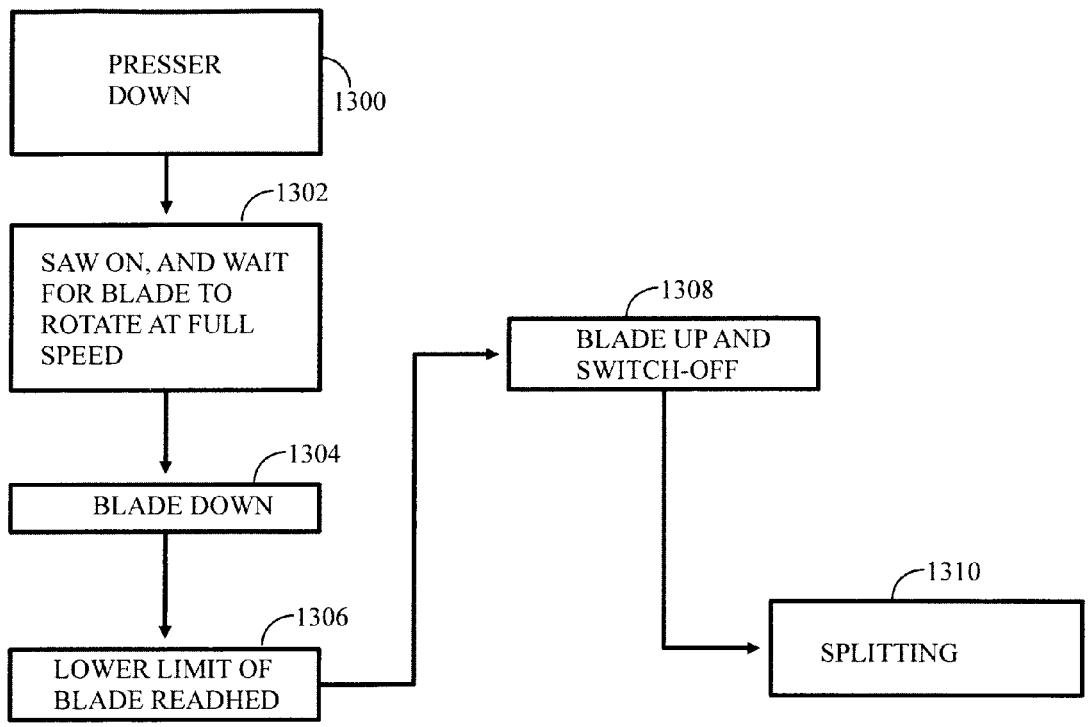
Figure 14:
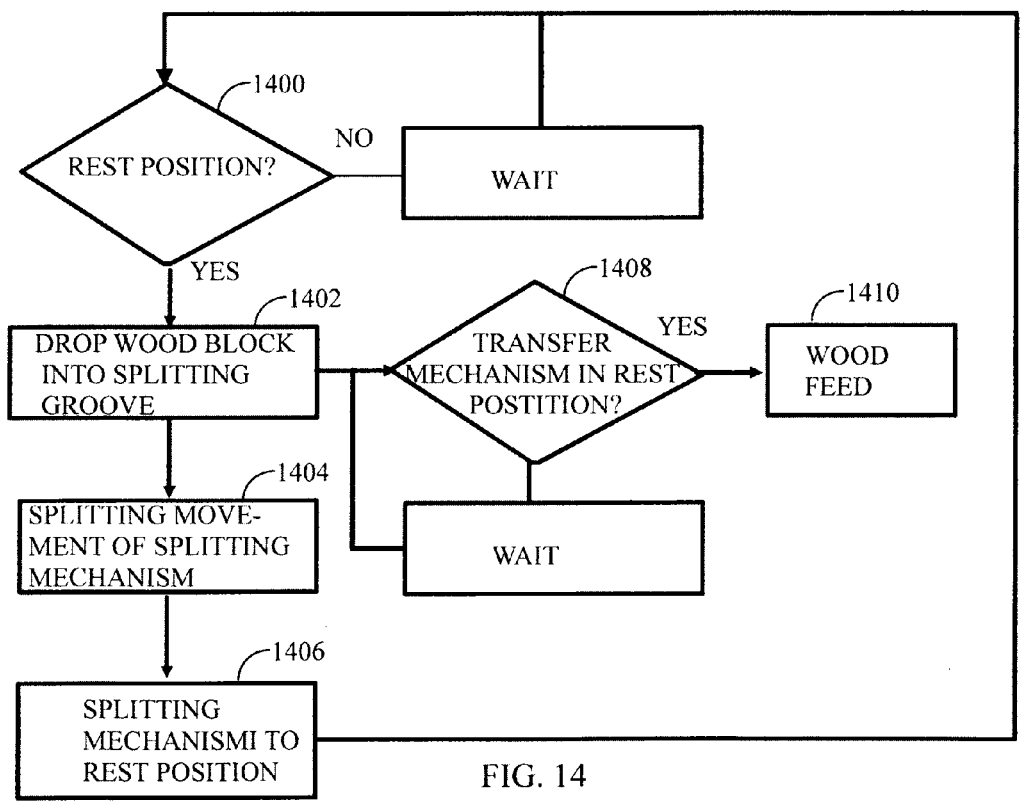
Figures 15, 16:
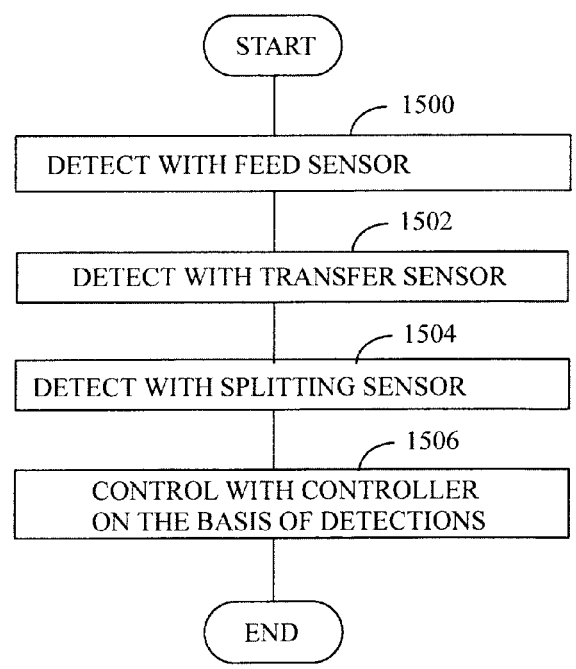

The invention will now be described in greater detail by means of preferred embodiments and with reference to the accompanying drawings, in which:

FIG. 1 is a block diagram of a device,
FIG. 2 is an example of the device,
FIG. 3a shows a transfer mechanism in inaction,
FIG. 3B shows the transfer mechanism while moving a wood block into a splitting mechanism,
FIG. 4A shows detection of a forward end of a log,
FIG. 4B shows detection of a tail end of a log and a measuring sensor of a conveyor belt,
FIG. 5A shows a feed sensor having a plurality of detecting elements,
FIG. 5B shows the feed sensor having a plurality of elements, by which feed sensor log movement is detected,
FIG. 6 shows detection of a tail end of a log and a measuring sensor of a roller conveyor,
FIG. 7 shows detection of a tail end of a log and a measuring wheel sensor for a log,
FIG. 8A shows an optical sensor,
FIG. 8B shows a camera sensor,
FIG. 8C shows an ultrasound sensor,
FIG. 8D shows a mechanical sensor,
FIG. 8E shows a second mechanical sensor,
FIG. 8F shows a line sensor,
FIG. 9A shows division of the last wood blocks of the log without redimensioning,
FIG. 9B shows division of the last wood blocks of the log after changing the order,
FIG. 9C shows division of the last wood blocks of the log after changing the dimensioning,
FIG. 9D shows a solution in which the last wood block and at least one other wood block are given in advance an individual length,
FIG. 10 shows measurement of wood log thickness,
FIG. 11A shows a situation where a cylinder of the splitting mechanism has started pushing a piston towards the wood block,
FIG. 11B shows a situation where the cylinder has pushed the wood block with the piston against the splitting section,
FIG. 11C shows a situation where the wood block has been split into firewood,
FIG. 12 is a flow chart of wood log feed,
FIG. 13 is a flow chart of cutting a wood log,
FIG. 14 is a flow chart of splitting a wood block,
FIG. 15 shows a work cycle of the device and
FIG. 16 is a flow chart of the method.

DESCRIPTION OF EMBODIMENTS

FIG. 1 shows a simple block diagram of a device that may automatically cut wood logs into wood blocks of a defined measure and to split the wood blocks at the same time in a desired manner. The device may comprise a feed mechanism 100, a cutting mechanism 102, a splitting mechanism 108, a feed sensor 110 and a control circuit 116. In addition, the device may comprise a carrier 104, a transfer mechanism 106, a transfer sensor 112 and a splitting sensor 114. Further, in connection with the cutting mechanism 102 there may be a cutting sensor 150.

In an embodiment the device may still comprise a locking mechanism 1000. In an embodiment the device may comprise measuring means 1006 for measuring the thickness of the log 118, which measuring means may be a sensor and associated with the locking mechanism. The sensors 110, 112, 114, 150 and 1006 and the controller 116 may operate electrically. Also the feed mechanism 100, the cutting mechanism 102, the transfer mechanism 106 and the splitting mechanism 108 may operate electrically. However, the cutting mechanism 102 may also cut the log 118 by means of a combustion engine, for instance, even though the cutting mechanism 102 may be moved electrically in the cutting step. In addition, the feed mechanism 100, the cutting mechanism 102, the transfer mechanism 106 and the splitting mechanism 108 may receive mechanical energy for their operation from an external source, such as a transmission gear of a tractor. The carrier 104 and the transfer mechanism 106 may form an interface between cutting and splitting of the log 118.

FIG. 2 shows a possible structure of a device, in which a wood log 118 is transferred to be ready for cutting, and off the log 118 is cut a wood block 120 that the splitting mechanism 108 is splitting. After starting the device, the feed mechanism may be in operation, and thus the device may await the first log 118 to enter the feed mechanism.

The operation and structure of the device are now examined by means of FIGS. 1 and 2. The feed mechanism 100 may feed the wood log 118 placed thereon for being cut by the cutting mechanism 102. The feed mechanism 100 may comprise a conveyor belt, a roller conveyor, a chain conveyor, mechanical grapples, a combination thereof, or the like, for moving the wood log 118. When the log 118 is detected, the forward end 122 of the log 118 may be shifted, for instance, for a preset length $L_M$ beyond the cutting mechanism 102. In an embodiment, the wood log 118 is thus for the preset length $L_M$ on the side of the carrier 104. In that case the cutting mechanism 102 may cut the log 118 such that a detached wood block 120 of a predetermined length, off the log 118, will remain on the carrier 104. The predetermined length $L_M$ may be 30 cm, for instance. The cutting mechanism 102 may comprise a chain saw, a circular saw, or the like, for cutting the wood log 118.

In an alternative embodiment, after cutting the wood block 120 may move directly into the splitting mechanism 108, for instance, by dropping. In that case, the control circuit 116 may have been adjusted for the cutting of the log 118, by way of software, such that the splitting mechanism 108 has had time to return to its rest position before cutting and dropping the wood into the splitting mechanism 108.

The feed sensor 110 may detect the distance Δ of the log 118 on the feed mechanism 100 in the feed direction at a predetermined location in the device as the log 118 approaches the cutting mechanism 102. The feed sensor 110 may be located on a wall adjacent to the feed mechanism 100, as shown in FIG. 2, yet the location is not restricted thereto, but, in general, the feed sensor 110 may be located at any place in the wood splitter that is found appropriate. The feed sensor 110 may be e.g. an optical sensor, an ultrasound sensor, a pressure sensor, or the like. A predetermined place in the device may be, for instance, the cutting mechanism 102 and more precisely, for instance, the location of its cutting blade 200 at the moment of cutting. The wood log 118 may be detected, for instance, for the forward end 106, when a first wood block 120 is to be cut off the wood log 118. The distance Δ depends on the size of the device, but it may be 80 cm, for instance. Generally, the distance Δ may be longer than the predetermined length $L_M$.

A transfer detector 112 detects, for instance, whether the carrier 104 is ready to receive the wood log 118 or not. The transfer sensor 112 may be, for instance, an optical sensor, an ultrasound sensor, a pressure sensor or the like, whereby the transfer sensor 114 may detect a change in propagation of optical radiation or ultrasound caused by the log 118 or the wood block 120 on the carrier 104. The pressure sensor, in turn, may detect the mass of the log 118 or the wood block 120 against the carrier 104. Alternatively or additionally, the transfer sensor 112 may detect whether the transfer mechanism 106 has returned to its inactive position after performing the transfer. In connection with starting the device, the transfer mechanism 106 is set to its inactive position, whereby the transfer sensor 112 detects that the transfer mechanism 106 has returned to its inactive position and the carrier 104 is ready to receive the log 118.

The splitting sensor 114 detects whether the splitting mechanism 108 is ready to receive the wood block 120 or not. The splitting sensor 114 may detect, for instance, whether the splitting mechanism 108 is in its rest position or whether the splitting mechanism 108 is performing a splitting operation.

The control circuit 116 controls the feed mechanism 100 which feeds the wood log 118, on the basis of the control, for a predetermined length M up to the carrier 104. The predetermined length M may be the sum of the distance Δ at the predetermined point in the device, when the first wood block 120 is cut off the log 118, and the predetermined length $L_M$, $M=\Delta+L_M$. When a second and a subsequent wood block 120 is cut, the predetermined length M may be the same as the predetermined length $L_M$, because after cutting the end of the log 118 is at the cutting mechanism 102 and as the log 118 is transferred for the predetermined length onwards, a wood block 120 of the predetermined length may be cut off the log 118. As last wood blocks are cut, the predetermined length M may also have other values ($L_X$, $L_{X1}$-$L_{X2}$).

The control provided by the control circuit 116 to feed the wood log 118 onwards may be based on the location of the log 118 detected by the feed sensor 110. In addition, the control circuit 116 may control the feed mechanism 100 to feed the wood log 118 onwards, if on the basis of the detection by the transfer sensor 112 the carrier 104 is ready to receive the wood log 118. If the carrier 104 is not ready to receive the log 118, the control mechanism 116 does not control the feed mechanism 100 to feed the wood log 118 to the carrier 104.

When a preset length of the wood log 118 has been fed onto the carrier 104, the controller 116 may stop the feed mechanism 100. The control circuit 116 may control the cutting mechanism 102, which on the basis of the control cuts a wood block 120 off a log 118 that is longer than a predetermined length $L_L$ onto the carrier 104, after the feed mechanism 100 has fed the log 118 for a preset length.

The control circuit 116 may control the transfer mechanism 106, which on the basis of the control transfers the wood block 120 from the carrier 104 to the splitting mechanism 108 after the cutting mechanism 102 has cut the log 118. The control circuit 116 controls the wood block 120 to be transferred to the splitting mechanism 108, in case the splitting sensor 114 has detected that the splitting mechanism 108 is ready to receive the wood block 120. If the splitting mechanism 108 is not ready to receive the wood block 120, the control mechanism 116 does not control the transfer mechanism 106 to move the wood block 120 away from the carrier 104.

FIGS. 3A and 3B show the transfer mechanism. In FIG. 3A, the wood block 120 is just provided on the carrier 104 after cutting. In that case a pusher 250 of the transfer mechanism 106 is still retracted from the carrier 104.

In FIG. 3B, the controller 116 has controlled the pusher 250 of the transfer mechanism 106 to push the wood block 120 into the splitting mechanism 108. The pusher 250 may comprise a rod that may be made of metal. However, the transfer mechanism of FIGS. 3A and 3B is not necessarily needed, in particular, if the wood block 120, for instance, falls after cutting into the splitting mechanism 108 by the effect of gravity.

The control circuit 116 may control the splitting mechanism 108 to split each wood block 120 longer than the predetermined length $L_L$, after the control circuit 116 has controlled the transfer mechanism 106 to transfer the wood block 120 into the splitting mechanism 108. The predetermined length $L_L$ determines the shortest wood block 120 that is to be split. Short wood blocks 120 are not necessarily split. The predetermined length $L_L$ may be 25 cm, for instance.

In an embodiment, in which the wood blocks may be split into two parts or more than two parts, the control circuit 116 may control the splitting mechanism 108 to split the wood block 120 into two parts, if the wood block 120 is smaller in thickness than a predetermined thickness. Wood blocks 120 of the predetermined thickness, or larger than that, may be controlled by the controller 116 to be chopped into more than two parts. The controller 116 may also control the splitting mechanism 108 to leave the wood block 120 unsplit, if its thickness is less than a predetermined lowest thickness.

FIGS. 4A and 4B show an embodiment, in which the feed sensor 110 may comprise an end sensor 300, which may detect the forward end 122 and/or the tail end 124 of the log 118 at a known distance Δ from a predetermined device point, such as cutting mechanism 102.

As shown in FIG. 4A, in accordance with an embodiment the end sensor 300 may detect the forward end 122 of the uncut wood log 118. Thus, the control circuit 116 may control the feed mechanism 100 to feed the uncut wood log 118 in an amount of the sum M of the predetermined length $L_M$ and the known distance Δ into the device.

After the detection of the forward end 122 of the wood log 118, the control device 116 may control the feed mechanism 100 to feed the cut log 118 for the predetermined length $L_M$ for each cutting operation.

As shown in FIG. 4B, in accordance with an embodiment the end sensor 300 may detect the tail end 124 of the log 118 at a known distance Δ from the cutting mechanism 102, for instance. The control circuit 116 may determine the length of the wood log 118 on the basis of the detection of the tail end 124 of the wood log 118. In order to determine the length of the wood log 118 it is necessary to have information on how much the wood log 118 was transferred before the detection of the tail end 124 of the log 118 and/or after the detection of the tail end 124 of the log 118.

FIGS. 5A and 5B show a feed sensor 110 that comprises an array 500 to 516 of detecting elements. The information on how much the wood log 118 is moved may be received from the feed sensor 110, for instance, such that movement length AA of the tail end 124 is determined from the first detection of the tail end 124 to termination of feed. The first detection of the tail end 124 may be performed in a detecting element 500, which may represent the same as the sensor 300 of the tail end 124. At the termination of feed the tail end 124 may be detected by another detecting element 510. The distance Δ between the detecting elements 500 and 510 is known and it corresponds to the movement AA of the tail end 124. The distance Δ of the detecting element 500 from the cutting mechanism 102 (i.e. the other end of the wood log 118) is also known. In addition, the feed length of the feed mechanism 100 is known and it is $L_M$. When the tail end 124 of the wood log 118 is detected during the feed, the length P of the wood log 118 may be obtained, for instance, by formula $P=\Delta-A+L_M$, that is, from the known distance Δ between the first detecting element/sensor of the tail end 124 and the cutting mechanism 102 is subtracted the distance A between the first and the last detecting elements of the tail end 124 and thereto is added the predetermined length $L_M$. This corresponds to formula $P=\Delta-AA+L_M$. If the length P of the wood log 118 is not evenly divisible by the preset length $L_M$, at least one wood block 120 has to be cut shorter or longer than the preset length $L_M$.

In an embodiment a travel sensor 422 measures the movement of the feed mechanism 100. Instead of or in addition to the detecting elements the travel sensor 422 may provide information on how much the wood log 118 is moved during the feed. When the tail end 124 of the log 118 is detected by the end sensor 300 at the previously known distance Δ from the cutting mechanism 102, the control circuit 116 may determine, by the travel sensor 422, the distance AA travelled by the tail end 124 after the detection of the tail end 124. Thus, the length P of the wood log 118 will be, in accordance with the previous example, $P=\Delta-AA+L_M$.

In an embodiment the travel sensor 422 may measure the rotation of a roller 420 of the conveyor belt, for instance. When the number of rotations of a round roller is measured, the number of rotations may be translated into travel by multiplying the number of rotations by the roller radius and the coefficient 2π, where π is about 3.1415926. This travel corresponds to the movement length AA of the tail end 124. Instead of the rotation of the roller, the travel sensor 422 may also measure belt movement directly either optically or by a measuring wheel sensor.

FIG. 6 shows an embodiment, in which the travel sensor 422 measures the number of rotations of one or more rollers 600 in the roller conveyor, on the basis of which number it is possible to determine the travel of the log 118 fed by the feed mechanism after detection of the tail end 124 in accordance with the above example. This travel corresponds to the movement length AA of the tail end 124.

In an embodiment, the device may comprise a measuring wheel sensor 700, which is shown in FIG. 7. The measuring wheel of the measuring wheel sensor 700 may roll along the log 118 and feed information to the control circuit 116 on the travel run on the surface of the log 118 in the same way as in the measurement of the roller 420. When the tail end 124 is detected by means of the end sensor 300, the controller 116 may determine the length of the log 118 fed by the feed mechanism 100 after the detection of the tail end 124, which length corresponds to the movement length AA of the tail end 124.

Additionally or alternatively, the proceeding of the end 800 of the log 118 onto the carrier 104 may be measured in an optical, ultrasound-based, mechanical or other corresponding manner. Optical measuring may be based on auto-focusing used in cameras, for instance. In active measuring, shown in FIG. 8A, optical radiation 804 is transmitted from a sensor 802 at the end of the carrier 104 to the end of the wood log 118, and its reflection is measured with a sensor 802 from the end 800 of the wood log 118. In passive measuring, shown in FIG. 8B, from an image of a camera 806 serving as a sensor the controller 116 may determine the distance of the end of the wood log 118 from the end of the carrier 104. Determination from the image may be based on the highest contrast or, for instance, on how much the image size of the end of the log 118 changes as it approaches the camera placed at the end of the carrier 104. Ultrasound measuring, shown in FIG. 8C, may be based on the travel time of ultrasound 810 from an ultrasound sensor 808 at the end of the carrier 104 to the end of the log 118 and back. Mechanical measuring, shown in FIG. 8D, may be based, for instance, on the end 800 of the log 118 pushing a measuring stick 814, while proceeding, into a sensor 812. The sensor 812 may detect how deep inside the sensor 812 the measuring stick 814 has entered, and the control circuit 116 may utilize the obtained proceeding information on the log 118 in the control and in the measurement of wood quantity. Mechanical measuring of FIG. 8E is based on the end of wood log 118 changing the angle β of a measuring rod 818, which angle is measured by a sensor 816. By means of the measured angular information the control circuit 116 may determine the proceeding of the end 800 of the wood log 118 in the same way as the thickness of the log 118 is measured (to be described below). Optical measuring of FIG. 8F is based on each detecting element 820 to 830 detecting the end 800 of the log 118 in its vicinity. The information on the detecting element, up to which the end 800 of the log 118 has proceeded at any particular moment, may be inputted in the control circuit 116.

When the tail end 124 is detected, for instance in the manners shown in FIGS. 8A to 8E it is possible to measure the travel the end of the log 118 proceeds on the carrier 104 after the detection of the tail end 124. The measured travel corresponds to the movement length AA of the tail end 124.

When the tail end 124 of the wood log 118 is detected and the length of the log 118 is determined, it is possible to cut the log 118 into wood blocks of preset lengths. If the length of the log 118 is not evenly divisible by the preset length $L_M$, the last wood block 900 is shorter than the preset length, as FIG. 9A illustrates.

In an embodiment, the controller 116 may control a wood block shorter than the predetermined length $L_L$ without cutting directly to the splitting mechanism 108.

In an embodiment, which is illustrated by FIG. 9B, the control circuit 116 may set an individual, preset length $L_X$ for one other wood block 902 than the wood block 900 to be cut last, if the length P of the log 118 is not evenly divisible by the preset length $L_M$ of the wood block 120. The individual, preset length may be the one provided for the end block 900, in case the preceding blocks had been cut to the preset length. The individual, preset length $L_X$ may also deviate from that provided for the end block 900, in case the preceding wood blocks had been cut to the preset length.

In an embodiment, which is illustrated by FIG. 9C, the control circuit 116 may set preset, individual lengths $L_{X1}$ to $L_{X2}$ for several other wood blocks 904 to 906 than the wood block 900 to be cut last, in case the length P of the wood log 118 is not evenly divisible by the preset length $L_M$ of the wood block 120.

The control circuit 116 may control the feed mechanism 100 to feed the log 118 for each individual, preset length $L_X$, $L_{X1}$ to $L_{X2}$ in order to cut at least one other wood block 902, 904 to 906 than the last wood block 900. In an embodiment, which is illustrated by FIG. 9D, the controller 116 may also set an individual, preset length $L_{X1}$ to $L_{X2}$ for the last wood block 900 and at least one other wood block 902, 904 to 906. This procedure prevents a wood block of shorter than preset length from being caught in a gap at the cutting blade, which in manually controllable devices often causes malfunction that deteriorates operating efficiency of the device and may even break the device.

In an embodiment, the controller 116 controls to halve the wood block that is formed by the last piece of log 118 having the predetermined length $L_M$ and a piece of log 118 at the tail of the log 118 having shorter than predetermined length $L_M$. This procedure prevents formation of short remnants. In an embodiment the controller 116 controls the device not to produce wood blocks of shorter length than the predetermined length $L_L$. In that case the controller 116 may increase the length of the remnant over the preset length.

In an embodiment the device may comprise a locking mechanism 1000 (FIG. 2). The locking mechanism 1000 may comprise an actuator 1002, which may be an electric motor, for instance, and a presser 1004. The bar-like presser 1004 may be attached to the actuator 1002, which is attached to the device. The presser 1004 may provide an adjustable angle α with the plane of the feed mechanism 100. The controller 116 may control the presser 1004 to rise to its uppermost position after the cutting of the log 118. The presser 1004 may then be at its widest angle. When the controller 116 has controlled the feed mechanism 100 to stop feeding the log 118 for cutting, the controller 116 may control the actuator 1002 to press the presser 1004 against the wood log 118 in order for pressing the log against the halted feed mechanism 100 and for holding the log 118 in place for the duration of the cutting.

Alternatively or additionally the locking mechanism 1000 may also move in horizontal direction and press the wood log 118 against the back wall of the device.

The locking mechanism 1000 may also comprise measuring means 1006, which may be an angular sensor and which may feed angular information to the controller 116. The measuring means 1006 may be attached to the axle of the presser 1004. Because the length $L_T$ of the presser 1004 is known in advance, the controller 116 may determine the thickness of the log 118 to be cut on the basis of the angular information. The thickness T of the log 118 may depend on the angle α, for instance as follows: $T = L_T * \sin(\alpha)$.

The diameter of the log may be measured after a preset time delay after activating the presser 1004. Thus the system ascertains that the presser 1004 is in contact with the surface of the log 118 before the diameter is measured.

In an embodiment, the locking mechanism 1000 comprises a presser 1100 which moves in the up/down direction and whose movement may be measured by a measuring sensor 1102. This embodiment is shown in FIG. 10. On the basis of the data measured by the measuring sensor 1102 the control circuit 116 may determine the thickness of the wood log 118.

After the measurement of the diameter it is possible to activate the cutting mechanism 102. The activation time of the cutting mechanism 102 may be controlled with a parameter. The cutting blade of the cutting mechanism 102 may be pressed towards the wood log 118 after a delay to be set in advance. The cutting blade is pressed into the log 118 until a predetermined lower limit is achieved, which lower limit may be detected by a cutting sensor 150, and whereafter the cutting blade, controlled by the control circuit 116, may be lifted up and the cutting mechanism may be switched off or at least the cutting movement of the cutting blade (movement of a cutting chain or movement of a circular saw) may be halted.

In an embodiment, shown in FIGS. 11A, 11B and 11C, the splitting mechanism 108 comprises a V-shaped groove or the like (not shown in FIGS. 11A, 11B and 11C) and a hydraulic cylinder 1120, which pushes with a piston 1122, controlled by the controller 116, a wood block against a splitting section 1124, which may, in a general case, split the wood block 120 into two or more parts.

In FIG. 11A, the cylinder 1120 has started pushing the piston 1122 towards the wood block 120. In FIG. 11B, the piston 1122 has pushed the wood block 120 against the cross-shaped splitting section 1124. In FIG. 11C, the piston 1124 is pushed to its extreme position and starts retraction back into the cylinder 1120. In that case, the wood block 120 is split into four pieces 1126 to 1132.

In an embodiment the splitting section 1124 may be adjustable in height. Alternatively or additionally, the height of the wood block 120 may be adjusted. The control circuit 116 may control the mutual position of the wood block 120 and the splitting section 1124 wood-block-specifically, based on the measuring of the thickness of the log 118 by means of the locking mechanism 900. The height of the splitting section 1124 may be changed, for instance, by a mover 1130, such as an electric motor, a hydraulic cylinder, where the splitting section 1124 serves as a piston, etc. Correspondingly, it is possible to adjust the height of the wood block 120 in relation to the splitting section 1124. The adjustment of the mutual position of the splitting section 1124 and the wood block 120 is useful when focusing the splitting in the centre of the wood block 120 in the case where the wood block 120 is split into more than two pieces. For instance, wood blocks of smaller than predetermined thickness may be split into just two pieces, whereas larger wood blocks may be split into four pieces, for instance.

New thickness measurement data on the log 118 may be transferred to the splitting mechanism 108 after cutting the wood log 118 but after splitting the previous wood block. When the first wood block is being split, the controller 116 transfers the measurement data on the thickness of the log 118 immediately to the splitting mechanism 108. Thus, the splitting section 1124 of the splitting mechanism 108 is at correct height with respect to the wood block 120 to be split at each splitting moment.

The height of the splitting section 1124 may be measured, for instance, with an angular sensor through leverage. In angular sensor measurement the position of the splitting section 1124 is already known at the start, and no reference run is needed.

The splitting cylinder 1120 may be provided with sensors so as to detect the extreme position and the rest position. The piston of the splitting mechanism 108 may be pushed to the extreme limit and, thereafter, as far back inside the cylinder 1120 as possible to its rest position. The splitting sensor 114 may detect the retraction of the piston to its rest position inside the cylinder 1120, on the basis of which the control circuit 116 is ready to control the transfer mechanism 106 to transfer a new wood block into the splitting mechanism 108. Correspondingly, the splitting sensor 114 may also detect the extreme position of the piston.

FIG. 12 is a flow chart of log feed. In step 1200, the feed mechanism 100, such as a conveyor belt, may operate at a speed of 0.8 m/s, for instance, without being limited thereto, however. The feed mechanism 102 may operate so long that, in step 1202, it is detected that a preset length has been fed. When the preset length has been fed, the feed mechanism 102 is halted in step 1204. The feed mechanism 102 having been halted, preparation for cutting is started. In step 1206, the presser 1004 may be pressed to hold the wood log 118 in place. The presser 1004 having been pressed down, cutting of the wood log 118 is performed in step 1208. If the wood log 118 has been detected, but the log cannot be fed for the preset length in step 1202, the controller 116 may determine the length of the wood log 118 in step 1210. The controller 116 may optimize at least one of the last wood blocks to comply with an individual, predetermined length in step 1212. The controller 116 may change the preset length into a new individual, predetermined length in step 1214.

FIG. 13 is a flow chart showing cutting of the wood log 118. In step 1300 the controller 116 may control the presser 1004 to press down for holding the log 118 firmly in place. After this, in step 1302, the controller 116 may start the motion of the cutting blade of the cutting mechanism 102 and await, for a predetermined delay, the cutting blade motion to reach a cutting speed and cutting force. When the cutting blade works normally, in step 1304, the cutting blade of the cutting mechanism 102 may be pressed into the wood log 118. In step 1306, the cutting blade is pressed through the log all the way to a predetermined extreme position. If the cutting blade is pressed downwardly, the cutting blade is pressed all the way to its lower position. The extreme position of the cutting blade may be detected with a sensor, and consequently the control circuit 116 may pull the cutting blade off the wood log.

In case the cutting blade does not reach the lower limit during the predetermined delay, it may be assumed that the blade is jammed in the piece to be cut. The predetermined delay may be based, for instance, on the log thickness measurement, because the proceeding time of the cutting blade through the log all the way to its lower position may be assumed to be a function of the log thickness. If the blade is jammed, a blade pull-out operation may be started, in which the wood presser may hold the log in place and simultaneously the cutting blade is lifted upwardly. In case the cutting blade reaches the upper extreme position, the pull-out has succeeded and the cutting may be re-started.

In step 1308, the cutting blade is lifted back to its upper position, as usually, and the cutting mechanism 102 is switched off, or at least the cutting movement of the cutting blade is halted. Thereafter the process proceeds to step 1310, in which a wood block detached from the log is transferred by the transfer mechanism 106 into the splitting mechanism 108.

FIG. 14 is a flow chart showing splitting of a wood block. In step 1400, the control circuit 116 determines whether the splitting mechanism 108 is ready to split the wood block 120. If the splitting mechanism 108 is not ready, the controller 116 waits for readiness. In step 1402, the wood block is pushed into the splitting mechanism 108 if the controller 116 has found the splitting mechanism 108 to be ready to receive the wood block 120. When the wood block 120 is in the splitting mechanism 108, the splitting mechanism 108 performs the splitting of the wood block in step 1404. Upon completing the splitting, the splitting mechanism 108 returns to a state waiting for a wood block 120 in step 1406. In step 1408 the controller 116 determines whether the carrier 104 is vacant from the wood block 120 and the wood log 118. In case the carrier 104 is not vacant, waiting takes place. If there is no wood log 118 or wood block 120 on the carrier 104, the process proceeds to step 1410, in which the log 118 is fed for cutting and is subsequently cut. Thus it is possible to perform splitting simultaneously with feeding and cutting of the wood log 118.

Automatic, simultaneous and synchronized operation appears from FIG. 15, which shows the work cycle of the device. The two-row presentation represents parallel operations and the resulting operational efficiency. FIG. 15 shows typical ordinary durations of operations with delays. Feeding of the log 118 may take 2 seconds. Thereafter, the log 118 may be cut in 2.75 seconds. Thereafter, the transfer mechanism 106 may transfer the wood block 120 into the splitting mechanism in 0.25 seconds. As the wood log 118 is being fed and cut, a previous wood block 120 may be split. This operation may take 2.5 seconds. The return of the splitting mechanism 108 back to the state in which the splitting mechanism is able to receive a new wood block 120 may also take 2.5 seconds (in the case of a hydraulic cylinder).

The device may comprise a user interface 160 (FIG. 2), which may comprise keys and/or levers, by means of which the user may feed desired data into the memory of the device and, optionally, control the operation of the device. Feed data may include, for instance, a preset length, one or more individual, preset lengths, various delays associated with each particular operation. However, the user need not necessarily feed the data, because the device may be operated using the default values set during manufacturing. The user interface 160 may also include a display which shows the data desired by the user alphanumerically and/or graphically. The user interface 160 may also comprise a printer by which the desired data may be outputted on paper, for instance.

The device may also comprise a bus connector, through which the device may be connected to a local or long-distance network, such as (W)LAN ((Wireless Local Access Network) and the internet, through which several devices may communicate with one another.

The bus may be a CAN (Controller Area Network) bus, thanks to which all interconnected devices may readily and quickly communicate with one another. There may be, for instance, three interconnected devices and all the devices may feed firewood to one packing line. The devices may communicate with one another and advise the packing line which one of the devices has completed splitting at any particular time. Thus, a packing line robot will know on which platform to load the firewood. The packing robot may act as a commanding element in a multi-device system like this. The feeding and cutting processes of the devices may operate autonomously with respect to one another, but the packing robot may give a command to split and to the feed mechanism. Thus, it is possible to command a number of devices in parallel. There may be different packing forms. For instance, in a multi-device system the firewood of one device may be packed on two different platforms.

The control circuit 116 may store in memory the number, length and thickness of the cut wood blocks. By means of these data the control circuit 116 generates information on the length of each log, the total length of logs, the total quantity of processed wood, or the like, at each particular moment and presents the information to the user either without the user's request or at the user's request. This information may be useful, when split wood is packed. When the number and capacity of the packages are known, it is possible to split exactly the desired quantity of wood. The device may also alert on the required quantity of wood being split, if the user has stored a target quantity in the memory of the device.

FIG. 16 is a flow chart of the method. In step 1500, the feed sensor 110 detects the location of the wood log 118 to be moved with the feed mechanism 100 in relation to a predetermined point in the device. In step 1502, the transfer sensor 112 may detect whether the carrier 104 is ready to receive the log 118 or not. In step 1504, the splitting sensor 114 may detect whether the splitting mechanism 108 is ready to receive the wood block 120 or not. In step 1506, the control circuit 116 controls the feed mechanism 100 to feed the log 118 for a preset length onto the carrier 104 on the basis of the location of the log 118 detected by the feed sensor 110, in case, on the basis of the detection by the transfer sensor 110, the carrier 104 is ready to receive the log 118, the cutting mechanism 102 to cut from the log 118, which is longer than a preset length $L_L$, a wood block 120 onto the carrier 104 when the feed mechanism 100 has fed the log 118 for the preset length, the transfer mechanism 106 to transfer the wood block 120 from the carrier 104 to the splitting mechanism 108 when the cutting mechanism 102 has cut the log 118, in case the splitting sensor 114 has detected that the splitting mechanism 108 is ready to receive the wood block 120 and the splitting mechanism 108 to split each wood block 120 longer than the predetermined length $L_L$ when the transfer mechanism 106 has transferred the wood block 120 into the splitting mechanism 108.

The control circuit 116 may comprise a processor, memory and an appropriate computer program. It is possible to store in the memory a predetermined length $L_M$, each individual preset length $L_X$, $L_{X1}$, $L_{X2}$, a predetermined measurement $L_L$, various delays and parameters. The data stored in the memory may be in table format. The processor may retrieve the data from the memory, when the program needs them. The computer program may also be stored in the memory.

The methods in accordance with the flow charts shown in FIGS. 12 to 14 and 16 may be implemented as one or more computer programs. The computer program may be run on an electronic, digital computer. The computer may comprise a read-alter memory (RAM), a central processing unit (CPU) and a system clock. The central processing unit may comprise a number of registers, an arithmetic logic unit (ALU) and a control unit. The control unit is controlled by a sequence of program commands, which is transferred to the central processing unit from the read-alter memory. The central processing unit may include a number of micro commands for basic operations. Implementations of the micro commands may vary depending on the configuration of the central processing unit. The program commands may be encoded in a programming language, which may be a high-level programming language, such as C or Java, or a lower-level programming language, such as a machine language or an assembler. The computer may also include an operating system, which may provide system services for a computer program written with program commands.

The computer program may be placed on a computer program distribution means for the distribution thereof. The computer program distribution means is readable with a data processing device and it encodes the computer program commands to control the operation of the device.

The distribution means, in turn, may be a solution known per se for distributing a computer program, for instance a computer-readable medium, a program storage medium, a computer-readable memory, a computer-readable software distribution package, a computer-readable signal, a computer-readable telecommunication signal or a computer-readable compressed software package.

Even though the invention is described above with reference to the attached drawings, it is clear that the invention is not restricted thereto, but it may be modified in a variety of ways within the scope of the accompanying claims.

The invention claimed is:

1. A device comprising:
   a feed mechanism, a cutting mechanism, a splitting mechanism, a feed sensor and a control circuit, and
   the feed mechanism is configured to feed a wood log to the cutting mechanism, the wood log having a length equal to a distance from a forward end of the wood log to a tail end of the wood log, the length of the wood log being unknown to the device;
   the feed sensor comprises an end sensor and is arranged to detect a location of the wood log to be moved by the feed mechanism in relation to a predetermined point in the device, the end sensor being arranged to detect the forward end of the wood log and the tail end of the wood log at a known distance from the cutting mechanism;
   the control circuit is arranged to:
   control the feed mechanism to feed the wood log for a preset length based on the location of the wood log detected by the feed sensor such that the feed mechanism is arranged to feed the wood log for a sum of the preset length and the known distance into the device from a point where the end sensor has detected the forward end of the wood log at the known distance from the cutting mechanism, and the cutting mechanism is configured to cut a wood block of the preset length from the wood log under control of the control circuit, determine the length of the wood log based on detection of the tail end of the wood log and the feed of the wood log, determine that the length of the wood log is not evenly divisible by the preset length, upon making the determination that the length is not evenly divisible by the preset length, set the feed mechanism for a second wood block other than a last wood block of the wood log of the preset length, the second wood block of a second length to be cut from the wood log, the second length being different than the preset length, control the feed mechanism to feed the wood log for the second length to cut the second wood block;

the cutting mechanism configured to cut, from the wood log, a wood block of the preset length and the second wood block of the second length longer than the preset length based on the feed of the preset length and the second length made by the feed mechanism, respectively; and the splitting mechanism to split the wood block cut from the wood log.

2. The device of claim 1, further comprising:
a carrier and a transfer mechanism;
the carrier is arranged to receive the wood block cut from the wood log; and
the control circuit is arranged to control the transfer mechanism to transfer the wood block from the carrier to the splitting mechanism after the cutting mechanism has cut the wood log.

3. The device of claim 2, further comprising:
a transfer sensor and a splitting sensor;
the transfer sensor is arranged to detect whether the carrier is ready to receive the wood log or not;
the splitting sensor is arranged to detect whether the splitting mechanism is ready to receive the wood block or not; and
the control circuit is arranged to control the transfer mechanism to transfer the wood block from the carrier to the splitting mechanism after the cutting mechanism has cut the wood log, in case the splitting sensor has detected that the splitting mechanism is ready to receive the wood block.

4. The device of claim 2, wherein the control circuit is arranged to control the feed mechanism to feed the wood log for the preset length all the way to the carrier based on the location of the wood log detected by the feed sensor, in case, based on the detection by a transfer sensor, the carrier is ready to receive the wood log.

5. The device of claim 1, wherein the control circuit is arranged to control the feed mechanism to feed the wood log to the cutting mechanism, which is cut at least once by the cutting mechanism, for the preset length for at least one cut.

6. The device of claim 1, wherein the control circuit is arranged to set a corresponding length for the last wood block of the wood log and at least one other wood block of the wood log and to control the feed mechanism to feed the wood log for the corresponding lengths so as to cut the at least one other wood blocks.

7. The device of claim 1, wherein the device comprises:
a measuring means for measuring a thickness of the wood log;
the splitting mechanism comprises a splitting section; and
the control circuit is arranged to control a mutual position of the wood block and the splitting section wood-block-specifically based on a measurement of the thickness of the wood log.

8. The device of claim 7, further comprises:
a locking mechanism, and
the control circuit is arranged to control the feed mechanism to halt, the measuring means to press the wood log against the halted feed mechanism and the locking mechanism to lock the wood log into place during cutting.

9. A method performed by a device, the method comprising:
detecting a wood log to be moved by a feed mechanism in relation to a predetermined point in the device by using an end sensor of a feed sensor to detect a forward end of the wood log at a known distance from a cutting mechanism, the wood log having a length unknown by the device; and controlling, by a control circuit, the feed mechanism to feed the wood log for a preset length based on a location of the wood log detected by the feed sensor such that the feed mechanism feeds the wood log for a sum of the preset length and the known distance into the device after the end sensor has detected the forward end of the wood log at the known distance from the cutting mechanism, and the cutting mechanism is configured to cut a wood block of the preset length from the wood log under control of the control circuit, detecting a tail end of the wood log by the end sensor at the known distance from the cutting mechanism, determining the length of the wood log based on the detection of the tail end of the wood log and the feed of the wood log, determining that the length of the wood log is not evenly divisible by the preset length, setting the feed mechanism for a second wood block other than a last wood block of the wood log, the second wood block having a second length different than the preset length, controlling the feed mechanism to feed the wood log for the second length for cutting at least one other wood block than the last wood block, controlling the cutting mechanism to cut, from the wood log, a wood block of the preset length and the second wood block of the second length longer than the preset length based on the feed being of the preset length and the second length made by the feed mechanism, respectively; and controlling a splitting mechanism to split the wood block cut from the wood log.

10. The method of claim 9 further comprising:
controlling, with the control circuit, the feed mechanism to feed the wood log for a first length all the way to a carrier based on the location of the wood log detected by the feed sensor, in case, based on the detection by a transfer sensor, the carrier is ready to receive the wood log; and transferring, with a transfer mechanism, the wood block from the carrier to the splitting mechanism after the cutting mechanism has cut the wood log.

11. The method of claim 10, further comprising:
detecting with the transfer sensor whether the carrier is ready to receive the wood log or not;

detecting with a splitting sensor whether the splitting mechanism is ready to receive the wood block or not; and controlling with the control circuit the transfer mechanism to transfer the wood block from the carrier to the splitting mechanism after the cutting mechanism has cut the wood log, in case the splitting sensor has detected that the splitting mechanism is ready to receive the wood block.

12. The method of claim 9, further comprising:

controlling with the control circuit the feed mechanism to feed the wood log, which is cut at least once by the cutting mechanism, for the preset length for each cut.

13. The method of claim 9, further comprising:

setting with the control circuit a corresponding length for the last wood block of the wood log and at least one other wood block of the log; and controlling with the control circuit the feed mechanism to feed the wood log for the corresponding lengths in order for cutting said wood blocks.

14. The method of claim 9, further comprising:

measuring with measuring means a thickness of the wood log and controlling with the control circuit a mutual position of the wood block and a splitting section wood-block-specifically based on a measurement of the thickness of the wood log.

15. The method of claim 14, further comprising:

measuring the thickness of the wood log with a measuring sensor comprised by a locking mechanism.

16. A machine-readable storage medium having stored thereon instructions, which when executed by a device causes the device to:

detect a wood log on a feed mechanism in a feed direction at a point in the device by using an end sensor of a feed sensor to detect a forward end of the wood log at a known distance from a cutting mechanism, the length of the wood log being unknown to the device;

control the feed mechanism to feed the wood log for a preset length based on a location of the wood log detected by the feed sensor such that the feed mechanism, feeds the wood log for a sum of the preset length and the known distance into the device after the end sensor has detected the forward end of the wood log at the known distance from the cutting mechanism, the cutting mechanism being configured to cut a wood block of the preset length from the wood log under control of a control circuit, detect a tail end of the wood log by the end sensor at the known distance from the cutting mechanism, determine the length of the wood log based on the detection of the tail end of the wood log and the feed of the wood log, determine that the length of the wood log is not evenly divisible by the preset length;

upon making the determination that the length is not evenly divisible by the preset length, set the feed mechanism to feed the wood log for a second wood block of a second length to be cut from the wood log, control the feed mechanism to feed the wood log for the second length to cut the second wood block; and interact with the cutting mechanism to cut from the wood log, a wood block of the preset length and the second wood block of the second length longer than the preset length onto a carrier based on the feed of the preset length and the second length made by the feed mechanism, respectively.

17. The machine-readable storage medium of claim 16 being further caused to interact with a splitting mechanism to split the wood block cut from the wood log.

\* \* \* \* \*